(12) United States Patent
Schaefer et al.

(10) Patent No.: US 10,421,446 B2
(45) Date of Patent: Sep. 24, 2019

(54) SPINDLE NUT ASSEMBLY HAVING MULTIPLE STOP CAMS

(71) Applicants: Lucas Automotive GmbH, Koblenz (DE); Kelsey-Hayes Company, Livonia, MI (US)

(72) Inventors: Michael Schaefer, Dohr (DE); Christian Dilla, Bendorf (DE); Manuel Barbosa, Novi, MI (US); David Kwierant, Ann Arbor, MI (US)

(73) Assignees: Lucas Automotive GmbH, Koblenz (DE); Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 15/065,937

(22) Filed: Mar. 10, 2016

(65) Prior Publication Data

US 2017/0261053 A1    Sep. 14, 2017

(51) Int. Cl.

| F16D 55/08 | (2006.01) |
|---|---|
| B60T 13/74 | (2006.01) |
| F16D 55/226 | (2006.01) |
| F16D 65/18 | (2006.01) |
| F16D 125/40 | (2012.01) |
| F16D 121/24 | (2012.01) |

(52) U.S. Cl.
CPC .......... B60T 13/741 (2013.01); F16D 55/226 (2013.01); F16D 65/183 (2013.01); F16D 2121/24 (2013.01); F16D 2125/40 (2013.01); F16D 2250/0084 (2013.01)

(58) Field of Classification Search
CPC .................. F16D 2125/40; F16H 25/2015
See application file for complete search history.

(56) References Cited

U.S. PATENT DOCUMENTS

| 8,844,683 B2 | 9/2014 | Sternal et al. | |
|---|---|---|---|
| 2009/0133975 A1* | 5/2009 | Gilles | B60T 13/741 188/72.6 |
| 2009/0283371 A1 | 11/2009 | Winkler et al. | |
| 2011/0011191 A1* | 1/2011 | Osterlaenger | F16C 19/30 74/89.23 |

(Continued)

FOREIGN PATENT DOCUMENTS

| DE | 10 2014 219 259 | * 3/2016 | ......... F16D 2125/40 |
|---|---|---|---|
| EP | 2848836 A2 | * 3/2015 | .............. B60T 13/74 |

(Continued)

OTHER PUBLICATIONS

Machine translation of KR 10 2013 0058263 (no date).*

(Continued)

*Primary Examiner* — Nicholas J Lane
(74) *Attorney, Agent, or Firm* — MacMillan, Sobanski & Todd, LLC

(57) ABSTRACT

A spindle nut assembly for an electric parking brake has a spindle and a spindle nut. The spindle has a plurality of spindle stops and a plurality of external threads. The plurality of external threads has at least two threads. The spindle nut is operatively connected to the spindle, has a plurality of stop cams, and has a plurality of internal threads. At least one of the plurality of stop cams is engaged with at least one of the plurality of spindle stops when a first thread of the plurality of internal threads is started on any external thread of the plurality of external threads.

11 Claims, 7 Drawing Sheets

(56) References Cited

U.S. PATENT DOCUMENTS

| | | |
|---|---|---|
| 2011/0315492 A1 | 12/2011 | Sakashita |
| 2012/0090418 A1 | 4/2012 | Barthlein et al. |
| 2012/0325597 A1* | 12/2012 | Giering ................... F16D 65/14 |
| | | 188/72.3 |
| 2014/0090501 A1* | 4/2014 | Kuster ..................... F16D 1/10 |
| | | 74/424.75 |
| 2014/0158480 A1* | 6/2014 | Qian ..................... F16D 55/226 |
| | | 188/72.6 |
| 2017/0198790 A1* | 7/2017 | Ungar ................. F16H 25/2015 |
| 2017/0335931 A1* | 11/2017 | Moulon ................. B64C 13/28 |

FOREIGN PATENT DOCUMENTS

| | | | |
|---|---|---|---|
| GB | 895878 A * | 5/1962 | ......... F16H 25/2266 |
| KR | 1020130058263 A | 6/2013 | |

OTHER PUBLICATIONS

English-language abstract of DE 10 2014 219 259 (no date).*
Machine translation of EP 2848836 (no date).*
PCT International Search Report and Written Opinion, Application No. PCT/US2017/020866, dated May 26, 2017.

* cited by examiner

SPINDLE NUT ASSEMBLY HAVING MULTIPLE STOP CAMS

BACKGROUND OF INVENTION

This invention relates in general to vehicle disc brake assemblies and in particular to an improved spindle nut assembly for an electric parking brake actuator for use in such a disc brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when a driver of the vehicle depresses a brake pedal The structures of these drum brake assemblies and disc brake assemblies, as well as the actuators therefore, are well known in the art.

A typical disc brake assembly includes a brake disc or rotor which is secured to a wheel of the vehicle for rotation therewith. The disc brake assembly further includes a brake caliper that is slidably supported on pins secured to an anchor bracket. The anchor bracket is secured to a non-rotatable component of the vehicle, such as the axle flange or steering knuckle, which is connected to the vehicle frame. The brake caliper includes a pair of brake linings which are disposed on opposite sides of the brake disc. The brake linings are connected to one or more hydraulically or pneumatically actuated pistons for movement between a non-braking position and a braking position, wherein they are moved into frictional engagement with opposed braking surfaces of the brake disc. For example, when the driver of the vehicle depresses the brake pedal, the piston urges the brake linings from the non-braking position to the braking position so as to frictionally engage the opposed braking surfaces of the brake disc and thereby slow or stop rotation of the associated wheel of the vehicle.

The disc brake assembly may also include an actuator that is used to realize a parking brake function of the disc brake assembly. The actuator may be an electromechanical actuator. The actuator may comprise a rotationally restrained spindle nut threaded onto a motor driven spindle. As the spindle is rotationally driven, the spindle nut axially translates to move the piston and urge the brake linings between the braking and non-braking positions. The piston may be hollow with the spindle nut and spindle located inside the piston. When the brake linings are moved to the non-braking position, the spindle nut translates towards a stop surface of the spindle. Stops may be provided on the spindle nut and spindle such that a spindle nut stop engages a spindle stop before the spindle nut jams against the spindle.

However, when the spindle nut has multiple threads, the spindle nut is pre-positioned—e.g., a specific internal thread on the spindle nut is started on a specific external thread of the spindle—during assembly of the actuator such that the spindle nut stop will engage the spindle stop before the spindle nut jams against the spindle. Needing to pre-position the spindle nut increases assembly complexity fur the parking brake actuator. Therefore, it would be desirable to have the spindle nut stop engage the spindle stop without pre-positioning the spindle nut during assembly of the actuator.

SUMMARY OF INVENTION

This invention relates to a spindle nut assembly for an electric parking brake actuator for use in such a disc brake assembly and a disc brake assembly including such a spindle nut assembly.

According to one embodiment, a spindle nut assembly for an electric parking brake may comprise, individually and/or in combination, one or more of the following features: a spindle and a spindle nut. The spindle has a plurality of spindle stops and a plurality of external threads. The plurality of external threads has at least two threads. The spindle nut is operatively connected to the spindle, has a plurality of stop cams, and has a plurality of internal threads. At least one of the plurality of stop cams is engaged with at least one of the plurality of spindle stops when a first thread of the plurality of internal threads is started on any external thread of the plurality of external threads.

According to another embodiment, a spindle nut assembly for an electric parking brake may comprise, individually and/or in combination, one or more of the following features: a spindle and a spindle nut. The spindle has first, second, and third external threads and first, second, and third spindle stops. The spindle nut is threaded on the spindle and has a stop cam. One of the first, second, or third spindle stops is engaged with the stop cam. The first external thread is started on any of a plurality of internal threads on the spindle nut.

According to another embodiment, a method of assembling a spindle nut assembly for an electric parking brake may comprise, individually and/or in combination, one or more of the following features: screwing a spindle nut onto a spindle until at least one of a plurality of stop cams on the spindle nut engages at least one of a plurality of spindle stops on the spindle. At least one of the pluralities of stop cams and spindle stops is equal in quantity to a plurality of internal threads on the spindle nut. A first thread of the plurality of internal threads is started on any of a plurality of external threads on the spindle. The plurality of external threads has at least two threads.

A potential advantage of an embodiment is not pre-positioning the spindle:nut during assembly of the spindle nut assembly. Other advantages of this invention will become apparent to those skilled in the art from the following detailed description of the preferred embodiments, when read in light of the accompanying drawings.

DETAILED DESCRIPTION OF THE PREFERRED EMBODIMENTS

Referring now to FIGS. 1-6, there is illustrated a spindle nut assembly, indicated generally at 100, produced in accordance with the present invention. The spindle nut assembly 100 has a spindle nut or thrust piece, indicated generally at 102, and is for use with a disc brake assembly, indicated generally at 104.

The general structure and operation of the disc brake assembly 104 is well known in the prior art. For example, the disc brake assembly 104 may be such as is disclosed by U.S. Pat. No, 8,844,683 to Sternal et al, the disclosure of which is hereby incorporated by reference in entirety herein, Although this invention will be described and illustrated in connection with the particular disc brake assembly 104 disclosed herein, it will be appreciated that this invention may be used in connection with other types or kinds of disc brake assemblies, if so desired.

Figure 1:
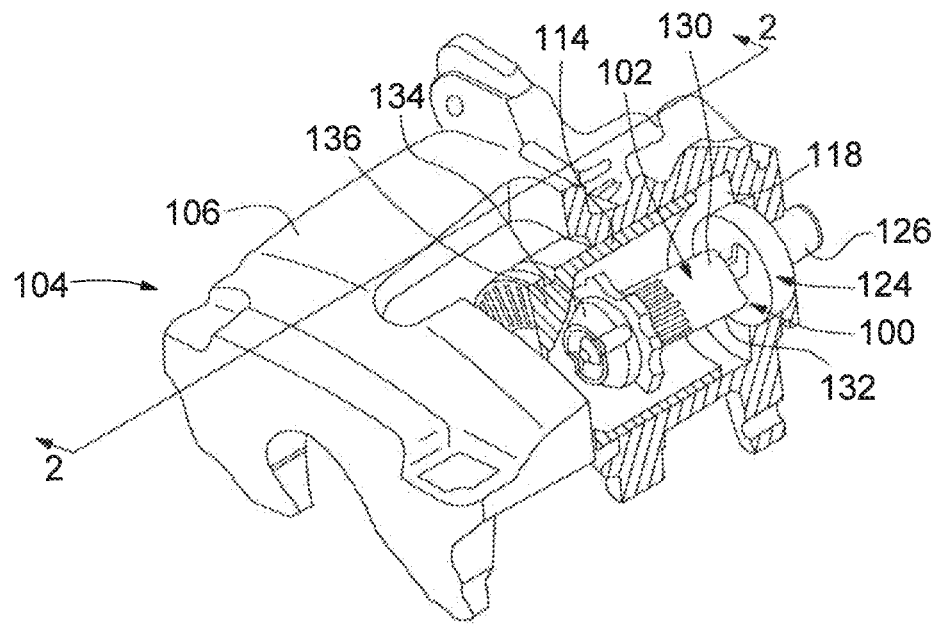
FIG. 1 is a sectional perspective view of an electromechanical actuator for a disc brake assembly using a spindle nut assembly in accordance with a first embodiment of the present invention.
Figure 2:
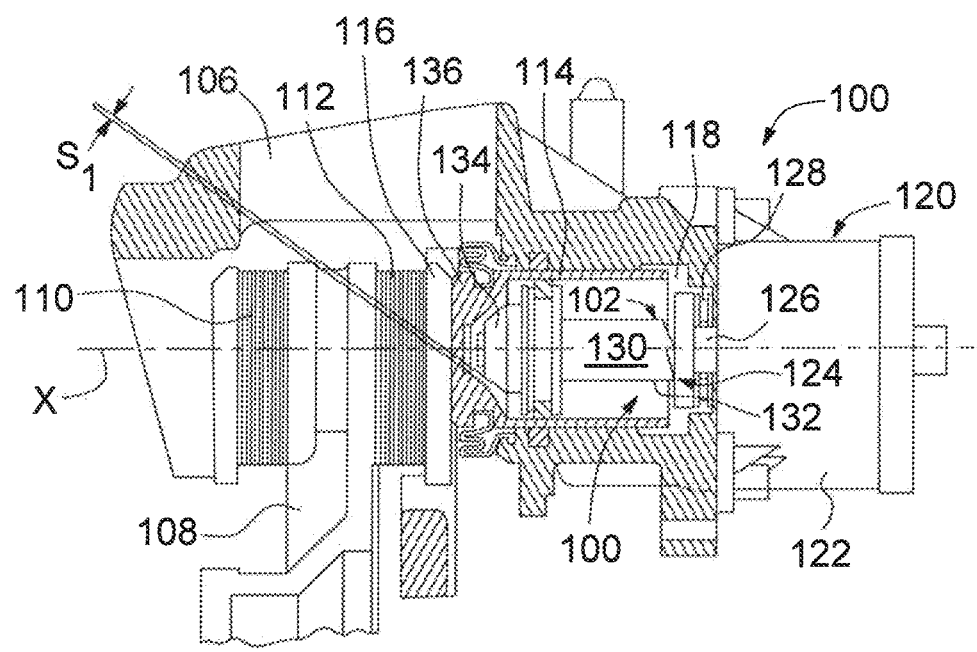
FIG. 2 is a sectional view taken along line 2-2 of FIG. 1.
Figure 3:
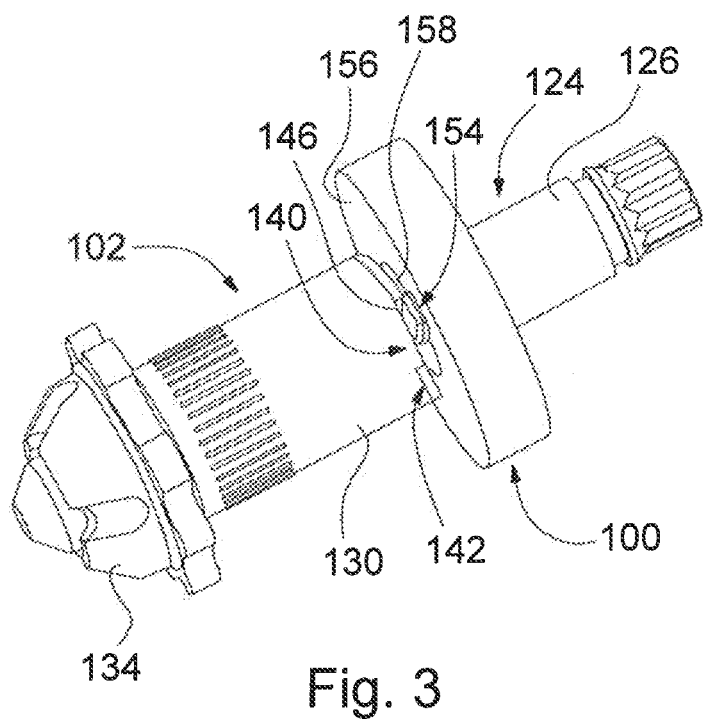
FIG. 3 is a perspective view of the spindle nut assembly of FIG. 1.
Figure 4:
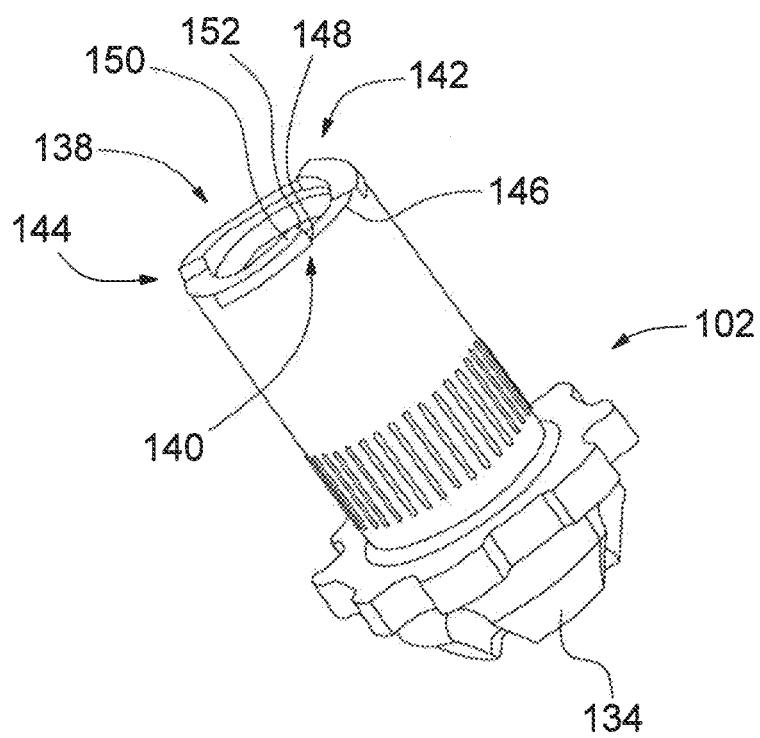
FIG. 4 is a perspective view of a spindle nut of the spindle nut assembly of FIG. 1.
Figure 5:
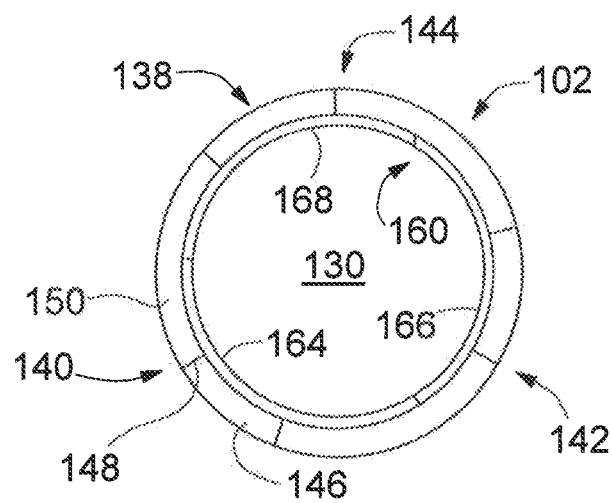
FIG. 5 is an end elevation view of the spindle nut of FIG. 4.
Figure 6:
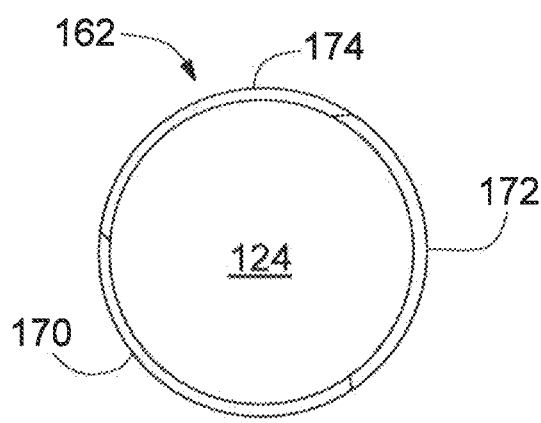
FIG. 6 is an end elevation view of a spindle of the spindle nut assembly of FIG. 1.
Figure 7:
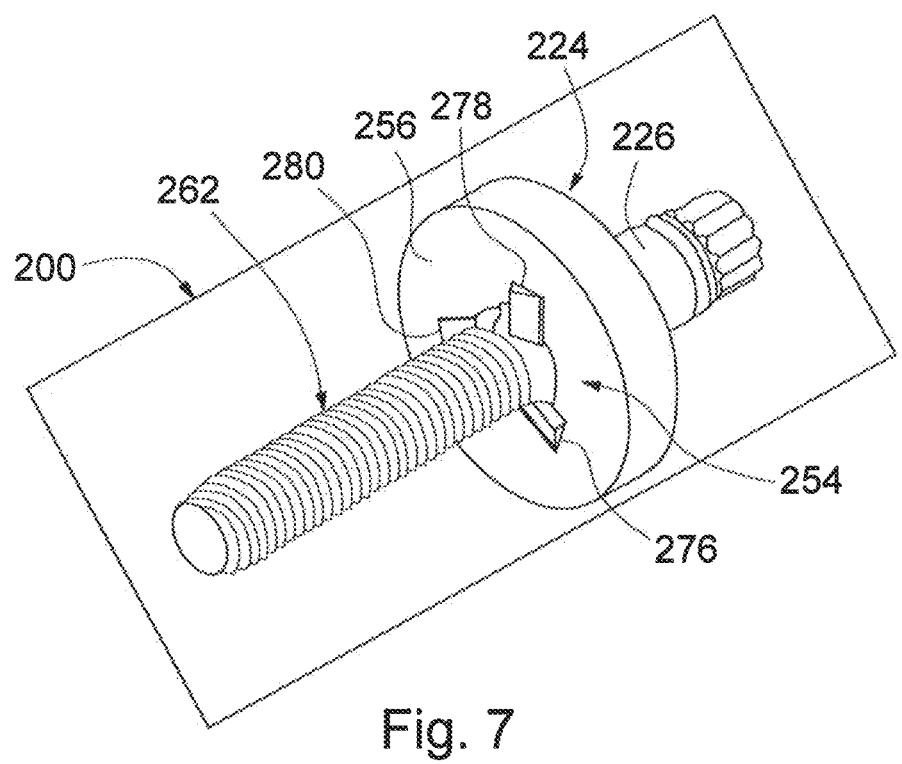
FIG. 7 is a perspective view of a spindle for use with a spindle nut assembly in accordance with a second embodiment of the present invention.
Figure 8:
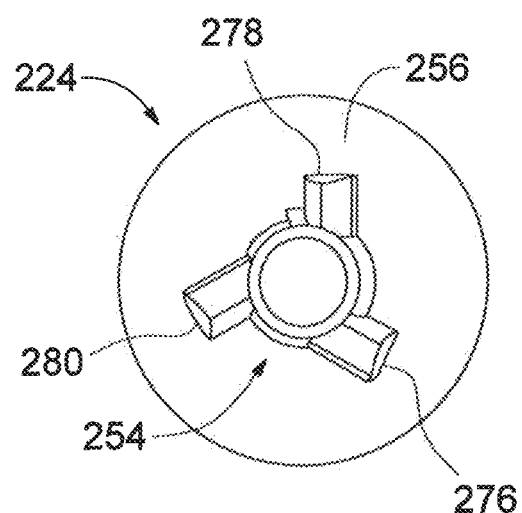
FIG. 8 is an end elevation view of the spindle of FIG. 7.
Figure 9:
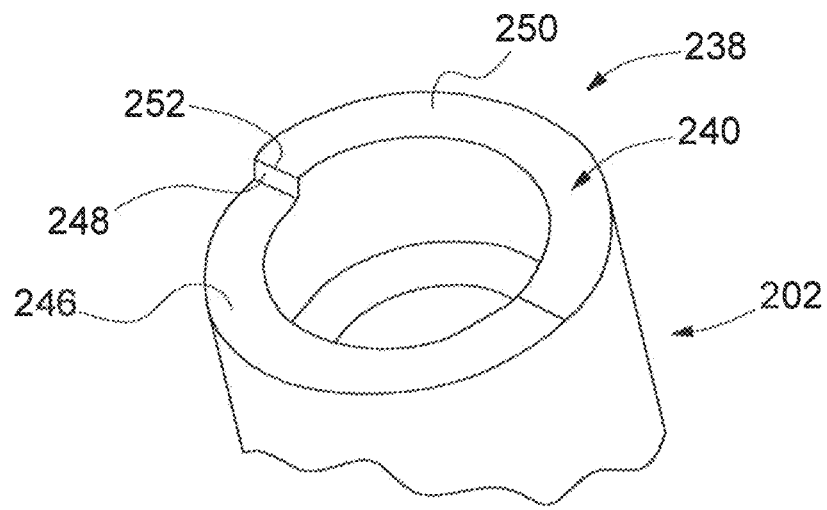
FIG. 9 is a partial perspective view of a spindle nut for use with the spindle of FIG. 7.
Figure 10:
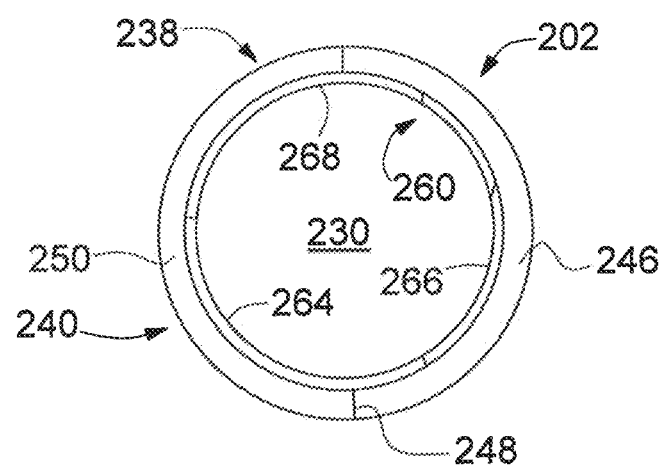
FIG. 10 is an end elevation view of the spindle nut of FIG. 9.
Figure 11:
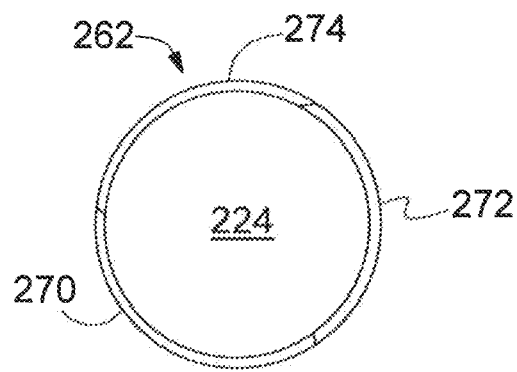
FIG. 11 is an end elevation view of the spindle of FIG. 7.
Figure 12:
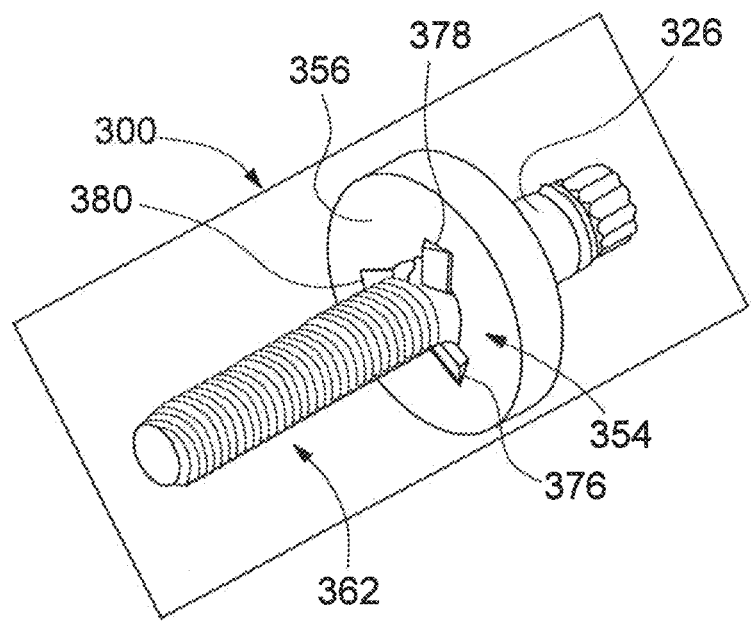
FIG. 12 is a perspective view of a spindle for use with a spindle nut assembly in accordance with a third embodiment of the present invention.
Figure 13:
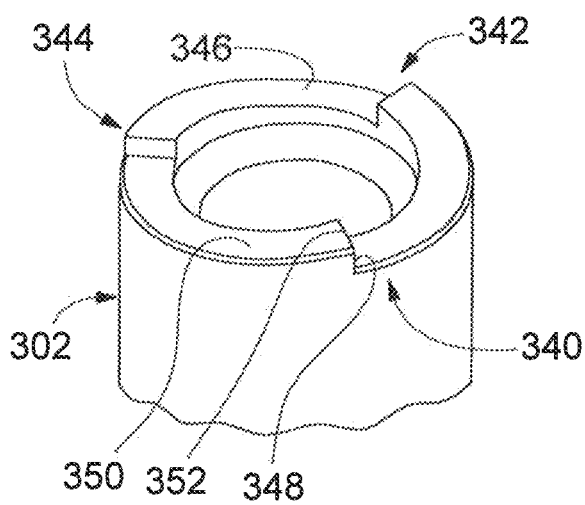
FIG. 13 is a partial perspective view of a spindle nut for use with the spindle of FIG. 12.
Figure 14:
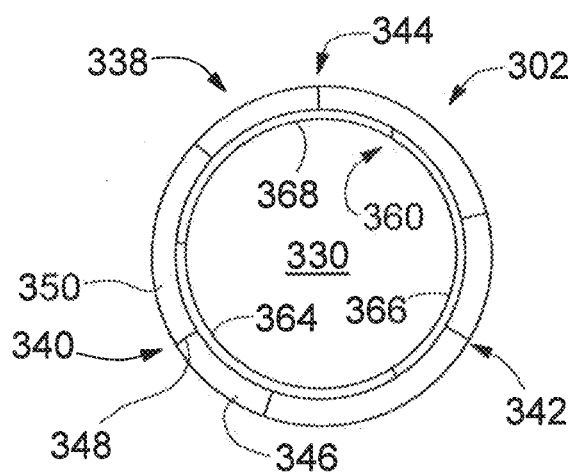
FIG. 14 is an end elevation view of the spindle nut of FIG. 13.
Figure 15:
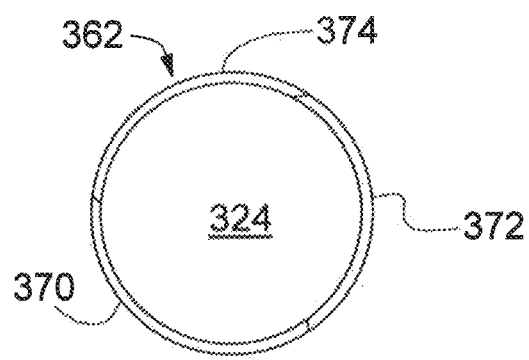
FIG. 15 is an end elevation view of the spindle of FIG. 12.

As illustrated in FIGS. 1 and 2, the disc brake assembly 104 includes a brake caliper 106, which is mounted in a floating manner by means of a brake carrier (not illustrated) in a manner known to those skilled in the art, and which spans a brake disc 108 that is coupled to a vehicle wheel (not illustrated) in a rotationally fixed manner. Provided in the brake caliper 106 is a brake lining assembly, which has an outboard brake lining 110 that bears on the brake caliper 106, and an inboard brake lining 112 that bears on an actuating piston 114. The outboard and inboard brake linings 110 and 112, respectively, face towards each other and, in a release position shown in FIG. 2, are disposed with a small air clearance on both sides of the brake disc 108, such that no significant residual drag moments occur. A brake lining carrier 116 is disposed between the inboard brake lining 112 and the piston 114 for the inboard brake lining 112 and piston 114 to move jointly. The piston 114 is mounted in a movable manner in a preferably cylindrical cavity 118 in the brake caliper 106.

In addition, it can be seen that the piston 114 is realized so as to be hollow. Accommodated in the piston 114 is the rotationally restrained spindle nut 102 of an electromechanical actuator, indicated generally at 120. The actuator 120 preferably includes a drive assembly 122 having a suitable electric motor and transmission assembly known to those skilled in the art. The spindle nut assembly 100 includes a drive spindle, indicated generally at 124. The drive assembly 122 is operatively connected to the spindle 124. An output shaft 126 of the drive assembly 122 drives the spindle 124, which is supported via an axial bearing 128, and which is accommodated in a threaded manner in a threaded receiver 130 of the spindle nut 102. An external surface 132 of the spindle nut 102 is preferably cylindrical.

The spindle nut 102 has a conical portion 134, which can be brought into bearing contact with a complementary conical inner portion 136 of the piston 114. In the release position, there is a clearance Si between the conical portion 134 and conical inner portion 136. The construction, shape, configuration, and/or make-up of the conical portion 134 and complementary inner portion 136 may be other than illustrated and described, if so desired. For example, the conical portion 134 and inner portion 136 may have other, non-conical complimentary shapes.

If service braking is desired for a vehicle having the disc brake assembly 104, the disc brake assembly 104 is hydraulically actuated. For example, the disc brake assembly may be hydraulically actuated by a driver via a brake pedal or via a drive assistance system. When the disc brake assembly 104 is hydraulically actuated, hydraulic fluid is pressurized (by a suitable means known to those skilled in the art) in the cavity 118 such that the piston 114 is displaced leftward in FIG. 2 along a longitudinal axis X. As a consequence, and as is known to those skilled in the art, the inboard brake lining 112 is pressed onto the brake disc 108 by means of the brake caliper 106 and, at the same time, a corresponding displacement of the brake caliper 106 on an opposite side of the brake disc 108 causes the outboard brake lining 110 to be drawn against the opposite side of the brake disc 108.

As a result of the application of the pressurized hydraulic fluid to the cavity 118, the piston 114 is displaced leftward in FIG. 2, along the longitudinal axis X towards the brake disc 108 and into an active braking position. The spindle nut 102 remains unactuated, and therefore remains at an initial axial position illustrated in FIG. 2.

For activating the parking brake, in a manner similar to service braking, the piston 114 is first put into the active braking position through application of hydraulic pressure. Actuation of the actuator 120 then causes the spindle nut 102 to be displaced towards the brake disc 108, until the clearance $S_1$ been used up and the conical portion 134 bears on the corresponding conical inner portion 136 inside the piston 114. As a result, the piston 114 is axially supported, via the spindle nut 102 and the axial bearing 128, on the housing of the brake caliper 106 in a parking brake state.

Once the piston 114 is axially supported, the hydraulic pressure in the cavity 118 can be removed. The parking brake state is maintained because of the position of the spindle nut 102 and because of self-arresting (for example, by a self-arresting transmission between the spindle 124 and the receiver 130). The outboard and inboard brake linings 110 and 112, respectively, pressing against the brake disc 108 are supported via the spindle nut 102.

If the parking brake state is to be released, pressurized hydraulic fluid is again introduced into the cavity 118. As a result, the piston 114 is displaced slightly leftward, in the axial direction X, towards the brake disc 108 such that the spindle nut 102 is relieved of axial load. Through control of the actuator 120, the spindle nut 102 can be displaced back into the initial axial position illustrated in FIG. 2.

As illustrated in FIGS. 3-6, the spindle nut 102 has a plurality of stop cams, indicated generally at 138. As illustrated, the spindle nut 102 has first, second, and third stop cams, indicated generally at 140, 142, and 144, respectively, for a total of three stop cams. Alternatively, the spindle nut 102 may have more or fewer than three stop cams. The second and third stop cams 142 and 144, respectively, are similar to the first stop cam 140. As such, discussion of the first stop cam 140 is also applicable to the second and third stop cams 142 and 144, respectively. The cams 138 are located on an end face 146 of the spindle nut 102.

The first stop cam 140 has a vertical stop 148 and a cam portion 150. The vertical stop 148 is between the end face 146 and the cam portion 150. As illustrated, the vertical stop 148 is in a plane normal to the external surface 132 of the spindle nut 102 and that extends along the longitudinal axis X. Alternatively, the vertical stop 148 may be other than as illustrated. For example, the vertical stop 148 may be other than a plane, other than normal to the external surface, and/or otherwise inclined or angled.

The cam portion 150 rises from the end face 146 to a top edge 152 of the vertical stop 148. As illustrated, the cam portion 150 has a constant slope ramp and cross section. Alternatively, the cam portion 150 may have other than a constant slope and/or cross section. As illustrated, the cams 138 are equally spaced about a circumference of the spindle nut 102. Alternatively, the cams 138 may be other than equally spaced about the circumference of the spindle nut. As illustrated, there are exposed portions of the end face 146 between the cams 138. Alternatively, the cams 138 may be of a length that leaves more or less of the end face 146 uncovered. For example, the cams 138 may entirely cover the end face 146.

The spindle 124 has a plurality of spindle stops, indicated generally at 154, on a stop face 156. As illustrated, the plurality of spindle stops 154 is a single spindle stop. The spindle stop 154 extends outward from the stop face 156 and towards the spindle nut 102. The stop face 156 extends circumferentially around, and perpendicular to, the longitudinal axis X. When the spindle nut 102 translates towards the stop face 156, one of the cams 138—i,e., the first, second, or third stop cam 140, 142, or 144, respectively—engages or contacts the spindle stop 154 such that a separation or gap 158 is present between the spindle nut 102 and the stop face 156. For example, the first stop cam 140 may engage the spindle stop 154 when the vertical stop 148 strikes or engages a face of the spindle stop 154. One of the cams 138 engaging the spindle stop 154 prevents or stops the end face 146 from contacting the stop face 156.

The spindle nut 102 has a plurality of internal threads 160 and the spindle 124 has a plurality of external threads 162. A number of threads in each of the pluralities of internal and external threads 160 and 162, respectively, is equal such that the spindle nut 102 may he threaded, screwed, or otherwise operatively connected on the spindle 124. The number of threads in each of the pluralities of internal and external threads 160 and 162, respectively, is also equal in quantity to the number of cams 138.

As illustrated, the internal threads 160 have three threads: first, second, and third internal threads 164, 166, and 168 respectively. Alternatively, the internal threads 160 may have more or less than three threads. As illustrated, the external threads 162 also have three threads: first, second, and third external threads 170, 172, and 174, respectively. Alternatively, the external threads 162 may have more or less than three threads.

When the spindle nut 102 is threaded on the spindle 124, any of the internal threads 160 may be started on any of the external threads 162. For example, the first internal thread 164 may be started on any of the plurality of external threads 162—i.e., on any of the first, second, or third external threads 170, 172, or 174, respectively.

The cams 138 are positioned on the end face 146 relative to the internal threads 160 such that one of the cams 138 will engage the spindle stop 154 before the end face 146 contacts the stop face 156. A size of the separation 158 may be adjusted or tuned by adjusting the position of the cams 138 on the end face 146 relative to where the internal threads 160 starts. Likewise, the size of the separation 158 may be adjusted or tuned by adjusting a position of the spindle stop 154 relative to the external threads 162. The spindle stop 154 is positioned such that one of the cams 138 will engage the spindle stop 154 before the end face 146 contacts the stop face 156.

Referring now to FIGS. 7-11, there is illustrated a second embodiment of a spindle nut assembly, indicated generally at 200, produced in accordance with the present invention. Because the spindle nut assembly 200 is a variation of the spindle nut assembly 100 of FIGS. 1-6, like reference numerals, increased by 100, designate corresponding parts in the drawings and detailed description thereof will be omitted.

A spindle nut, indicated generally at 202, has a single stop cam, indicated generally at 240.

A drive spindle, indicated generally at 224, has a plurality of spindle stops, indicated generally at 254. The plurality of spindle stops 254 includes first, second, and third spindle stops 276, 278, and 280, respectively. Alternatively, the plurality of spindle stops 254 may include fewer or more than three spindle stops. As illustrated, the first, second, and third spindle stops 276, 278, and 280, respectively, are wedge-shaped. Alternatively, the first, second, and third spindle stops 276, 278, and 280, respectively, may be other than wedge-shaped. For example, the first, second, and third spindle stops 276, 278, and 280, respectively, may be similar to the spindle stop 154 shown in FIG. 3.

When the spindle nut 202 is threaded on the spindle 224, any of a plurality of internal threads, indicated generally at 260, may be started on any of a plurality of external threads, indicated generally at 262. For example, a first internal thread 264 may be started on any of the plurality of external threads 262—i.e., on any of first, second, or third external threads 270, 272, or 274, respectively.

The spindle stops 254 are positioned on a stop face 256 relative to the external threads 262 such that one of the spindle stops 254 will engage the stop cam 240 before an end face 246 contacts the stop face 256. When the one of the spindle stops 254 engages the stop cam 240, a separation is present between the spindle nut 202 and the stop face 256.

Referring now to FIGS. 12-15, there is illustrated a third embodiment of a spindle nut assembly, indicated generally at 300, produced in accordance with the present invention. Because the spindle nut assembly 300 is a variation of the spindle nut assembly 100 of FIGS. 1-6, like reference numerals, increased by 200, designate corresponding parts in the drawings and detailed description thereof will be omitted.

A spindle nut, indicated generally at 302, has a plurality of stop cams, indicated generally at 338.

A drive spindle, indicated generally at 324, has a plurality of spindle stops, indicated generally at 354. The plurality of spindle stops 354 includes first, second, and third spindle stops 376, 378, and 380, respectively. Alternatively, the plurality of spindle stops 354 may include fewer or more than three spindle stops. As illustrated, the first, second, and third spindle stops 376, 378, and 380, respectively, are wedge-shaped. Alternatively, the first, second, and third spindle stops 376, 378, and 380, respectively, may be other than wedge-shaped. For example, the first, second, and third spindle stops 376, 378, and 380, respectively, may be similar to the spindle stop 154 shown in FIG. 3.

When the spindle nut 302 is threaded on the spindle 324, any of a plurality of internal threads, indicated generally at 360, may be started on any of a plurality of external threads, indicated generally at 362. For example, a first internal thread 364 may be started on any of the plurality of external threads 362—i.e., on any of first, second, or third external threads 370, 372, or 374, respectively.

The spindle stops 354 are positioned on a stop face 356 relative to the external threads 362 such that at least one of the stop cams 340 will engage at least one of the spindle stops 354 before an end face 346 contacts the stop face 356. Typically, each of the stop cams 340 will engage one of the spindle stops 354. When the at least one of the spindle stops 354 engages the at least one of the stop cams 340, a separation is present between the spindle nut 302 and the stop face 356.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A spindle nut assembly for an electric parking brake comprising:
    a spindle having a plurality of spindle stops and a plurality of external threads, wherein the plurality of external threads has at least two threads and each of the plurality of spindle stops has an inclined face that is transverse to an axis about which the spindle rotates; and
    a spindle nut operatively connected to the spindle and having only one stop cam and a plurality of internal threads, wherein a vertical face of the only one stop cam is engaged with one of the inclined faces of the plurality of spindle stops when a first thread of the plurality of internal threads is started on any external thread of the plurality of external threads, wherein the vertical face of the only one stop cam is parallel to the axis about which the spindle rotates.

2. The spindle nut assembly of claim 1 wherein the quantity of the plurality of spindle stops is equal to the plurality of external threads.

3. The spindle nut assembly of claim 1 further comprising:
    a separation between the spindle nut and a stop face of the spindle.

4. The spindle nut assembly of claim 1 wherein the only one stop cam engaged with one of the plurality of spindle stops stops an end face of the spindle nut from contacting a stop face of the spindle.

5. The spindle nut assembly of claim 1 further comprising:
    a caliper having a cavity;
    a brake lining mounted to the caliper;
    a piston mounted in the cavity for displacing the brake lining; and
    an electromechanical actuator for supporting the piston, the actuator having a drive assembly configured to be operatively connected to the spindle, wherein rotation of the spindle by the drive assembly axially moves the spindle nut to engage and move the piston.

6. A spindle nut assembly for an electric parking brake comprising:
    a spindle having first, second, and third external threads and first, second, and third spindle stops, wherein the first, second, and third spindle stops have inclined faces that are transverse to an axis about which the spindle rotates; and
    a spindle nut threaded on the spindle and having only one stop cam, wherein the inclined face of one of the first, second, or third spindle stops is engaged with a vertical face of the only one stop cam when the first external thread is started on any of a plurality of internal threads on the spindle nut, wherein the vertical face of the only one stop cam is parallel to the axis about which the spindle rotates.

7. The spindle nut assembly of claim 6 wherein the first, second, and third spindle stops are located, on the spindle, relative to the first, second, and third external threads such that there is a separation between an end face of the spindle nut and a stop face of the spindle.

8. The spindle nut assembly of claim 6 further comprising:
    a separation between the spindle nut and a stop face of the spindle.

9. The spindle nut assembly of claim 6 wherein the only one stop cam is on an end face of the spindle nut and the first, second, and third spindle stops are on a stop face of the spindle.

10. The spindle nut assembly of claim 6 further comprising:
    a caliper having a cavity;
    a brake lining mounted to the caliper;
    a piston mounted in the cavity for displacing the brake lining; and
    an electromechanical actuator for supporting the piston, the actuator having a drive assembly configured to be operatively connected to the spindle, wherein rotation of the spindle by the drive assembly axially moves the spindle nut to engage and move the piston.

11. A spindle nut assembly for an electric parking brake comprising:
    a spindle having a plurality of spindle stops and a plurality of external threads, wherein the plurality of external threads has at least two threads and each of the plurality of spindle stops has an inclined face that is transverse to an axis about which the spindle rotates;
    a spindle nut operatively connected to the spindle and having only one stop cam and a plurality of internal threads, wherein a vertical face of the only one stop cam is engaged with one of the inclined faces of the plurality of spindle stops when a first thread of the plurality of internal threads is started on any external thread of the plurality of external threads and the vertical face of the only one stop cam is parallel to the axis about which the spindle rotates; and
    an end face of the spindle nut, wherein the only one stop cam rises from the end face and there is an exposed portion of the end face that is perpendicular to the axis about which the spindle rotates.

* * * * *